(12) United States Patent
Taira et al.

(10) Patent No.: US 12,038,755 B2
(45) Date of Patent: Jul. 16, 2024

(54) AUTONOMOUS MOVEMENT SYSTEM, AUTONOMOUS MOVEMENT METHOD, AND AUTONOMOUS MOVEMENT PROGRAM

(71) Applicant: TOYOTA JIDOSHA KABUSHIKI KAISHA, Toyota (JP)

(72) Inventors: Tetsuya Taira, Nagakute (JP); Shiro Oda, Anjo (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 306 days.

(21) Appl. No.: 17/528,289

(22) Filed: Nov. 17, 2021

(65) Prior Publication Data

US 2022/0261004 A1  Aug. 18, 2022

(30) Foreign Application Priority Data

Feb. 3, 2021   (JP) ................................ 2021-015581

(51) Int. Cl.
*G06V 20/00* (2022.01)
*G05D 1/00* (2006.01)
(Continued)

(52) U.S. Cl.
CPC ......... *G05D 1/0223* (2013.01); *G05D 1/0276* (2013.01); *G06V 20/10* (2022.01); *H04W 4/44* (2018.02)

(58) Field of Classification Search
CPC ..... G05D 1/0223; G05D 1/0276; H04W 4/44; G06V 20/10
(Continued)

(56) References Cited

U.S. PATENT DOCUMENTS 11,256,261 B1 * 2/2022 Bai ...................... G05D 1/0246
2018/0274935 A1   9/2018 Sugiyama

FOREIGN PATENT DOCUMENTS

JP   2017050797 A   3/2017
JP   2018163471 A   10/2018
(Continued)

*Primary Examiner* — Tiffany P Young
(74) *Attorney, Agent, or Firm* — Dickinson Wright, PLLC (57) ABSTRACT

An autonomous movement system according to an embodiment is an autonomous movement system for autonomous movement in a facility, the autonomous movement system changing a movement speed for the autonomous movement depending on a cooperation mode, a connection mode and a caution mode, the cooperation mode being a mode of moving while acquiring position information inside a first range in cooperation with a facility camera, the first range being a range that the facility camera photographs to generate image data, the facility camera being fixed in the facility, the connection mode being a mode of moving inside a second range and outside the first range, the second range being a range in which connection with an access point is performed by wireless communication, the access point being fixed in the facility, the caution mode being a mode of moving outside the first range and outside the second range.

4 Claims, 7 Drawing Sheets

(51) Int. Cl.
  *G06V 20/10* (2022.01)
  *H04W 4/44* (2018.01)
(58) Field of Classification Search
  USPC .......................................................... 701/23
  See application file for complete search history.

(56) References Cited

FOREIGN PATENT DOCUMENTS

| | | | |
|---|---|---|---|
| JP | 2019527657 | A | 10/2019 |
| WO | 2018035295 | A1 | 2/2018 |

* cited by examiner

AUTONOMOUS MOVEMENT SYSTEM, AUTONOMOUS MOVEMENT METHOD, AND AUTONOMOUS MOVEMENT PROGRAM

CROSS-REFERENCE TO RELATED APPLICATION

This application claims priority to Japanese Patent Application No. 2021-015581 filed on Feb. 3, 2021, incorporated herein by reference in its entirety.

BACKGROUND

1. Technical Field

The present disclosure relates to an autonomous movement system, an autonomous movement method and an autonomous movement program.

2. Description of Related Art

There has been developed an autonomous movement device that performs autonomous movement in a predetermined building or facility. The autonomous movement device includes a parcel stand, and thereby can serve as an automatic delivery device that automatically delivers a parcel. The automatic delivery device performs autonomous movement from a departure place to a destination, and thereby can deliver a parcel loaded at the departure place to the destination, for example.

For example, in Japanese Unexamined Patent Application Publication No. 2018-163471 (JP 2018-163471 A), in a situation where a plurality of autonomous traveling vehicles connected with a server through a network by communication such as a wireless LAN goes around a monitoring building, when one autonomous traveling vehicle of the plurality of autonomous traveling vehicles goes away, a non-monitoring period is minimized by change in vehicle speed.

SUMMARY

For example, the server in JP 2018-163471 A does not manage the vehicle speeds of the autonomous traveling vehicles depending on the degree of a state where the autonomous traveling vehicles can be controlled. Therefore, there is room for improvement in the management method for the autonomous traveling vehicles.

The present disclosure has been made for solving the problem, and provides an autonomous movement system, an autonomous movement method and an autonomous movement program that make it possible to control the movement speed depending on the control state of a mobile robot.

An autonomous movement system according to an embodiment is an autonomous movement system for autonomous movement in a facility, the autonomous movement system changing a movement speed for the autonomous movement depending on a cooperation mode, a connection mode and a caution mode, the cooperation mode being a mode of moving while acquiring position information inside a first range in cooperation with a facility camera, the first range being a range that the facility camera photographs to generate image data, the facility camera being fixed in the facility, the connection mode being a mode of moving inside a second range and outside the first range, the second range being a range in which connection with an access point is performed by wireless communication, the access point being fixed in the facility, the caution mode being a mode of moving outside the first range and outside the second range. By this configuration, it is possible to control the movement speed depending on the control state of the autonomous movement system.

An autonomous movement system according to an embodiment includes: an autonomous movement device that performs autonomous movement in a facility; a facility camera that photographs a first range in the facility to generate image data, the facility camera being fixed in the facility; an access point that is connected with the autonomous movement device inside a second range in the facility by wireless communication, the access point being fixed in the facility; and a server device that exchanges traveling information with the autonomous movement device and that acquires the image data from the facility camera, in which the autonomous movement device changes a movement speed for the autonomous movement depending on a cooperation mode, a connection mode and a caution mode, the cooperation mode being a mode of moving while acquiring position information inside the first range in cooperation with the facility camera, the connection mode being a mode of moving inside the second range and outside the first range, the caution mode being a mode of moving outside the first range and outside the second range. By this configuration, it is possible to control the movement speed depending on the control state of the autonomous movement system.

In the above autonomous movement systems, the movement speed in the cooperation mode may be higher than the movement speed in the connection mode and the movement speed in the caution mode, and the movement speed in the connection mode may be higher than the movement speed in the caution mode. By this configuration, it is possible to enhance the flexibility of control modes of autonomous movement system.

In the above autonomous movement systems, a route for the autonomous movement may be searched such that a necessary time is short, based on the movement speed in the cooperation mode, the movement speed in the connection mode and the movement speed in the caution mode. By this configuration, it is possible to shorten a movement time.

In the above autonomous movement systems, a route for the autonomous movement may be searched such that a section for the cooperation mode is large. By this configuration, it is possible to restrain position deviation from the movement route.

An autonomous movement method according to an embodiment is an autonomous movement method for an autonomous movement device that performs autonomous movement in a facility, the autonomous movement method including: a step of determining a mode from a cooperation mode, a connection mode and a caution mode, the cooperation mode being a mode of moving while acquiring position information inside a first range in cooperation with a facility camera, the first range being a range that the facility camera photographs to generate image data, the facility camera being fixed in the facility, the connection mode being a mode of moving inside a second range and outside the first range, the second range being a range in which connection with an access point is performed by wireless communication, the access point being fixed in the facility, the caution mode being a mode of moving outside the first range and outside the second range; and a step of changing a movement speed for the autonomous movement depending on the determined mode. By this configuration, it is possible to control the movement speed depending on the control state of the autonomous movement system.

An autonomous movement program according to an embodiment is an autonomous movement program for an autonomous movement device that performs autonomous movement in a facility, the autonomous movement program causing a computer to execute: determining a mode from a cooperation mode, a connection mode and a caution mode, the cooperation mode being a mode of moving while acquiring position information inside a first range in cooperation with a facility camera, the first range being a range that the facility camera photographs to generate image data, the facility camera being fixed in the facility, the connection mode being a mode of moving inside a second range and outside the first range, the second range being a range in which connection with an access point is performed by wireless communication, the access point being fixed in the facility, the caution mode being a mode of moving outside the first range and outside the second range; and changing a movement speed for the autonomous movement depending on the determined mode. By this configuration, it is possible to control the movement speed depending on the control state of the autonomous movement system.

The embodiments can provide an autonomous movement system, an autonomous movement method and an autonomous movement program that make it possible to control the movement speed depending on the control state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure will be described below with embodiments of the present disclosure. The disclosure according to the claims is not limited to embodiments described below. Further, all of configurations described in the embodiments are not needed as means for solving the problem. For clear explanation, in the following descriptions and drawings, omission and simplification are performed when appropriate. In the drawings, identical elements are denoted by identical reference characters, and repetitive descriptions are omitted as necessary.

Embodiment 1

An autonomous movement system according to Embodiment 1 will be described. In the embodiment, an autonomous movement system may be replaced by an autonomous movement device, and the autonomous movement device may be replaced by the autonomous movement system. Further, it may be understood that the autonomous movement system in the embodiment includes the autonomous movement device. The autonomous movement device performs autonomous movement in a predetermined facility. For example, the autonomous movement device may be a mobile robot that performs autonomous movement, or may be a carrying robot that performs autonomous movement for carrying an article. The mobile robot will be described below as an example of the autonomous movement device. The mobile robot will be described by being divided into Configuration of Mobile Robot and Behavior of Mobile Robot.

Configuration of Mobile Robot

Figure 1:
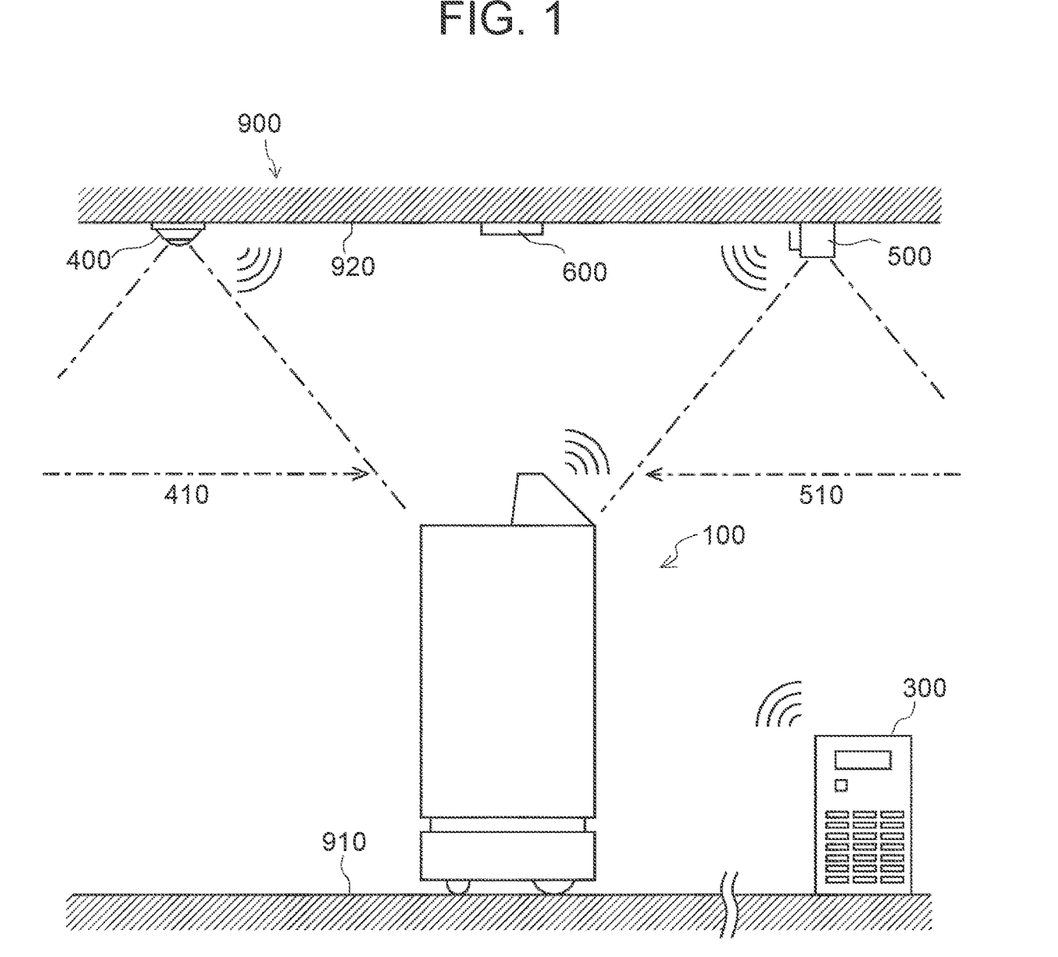
FIG. 1 is a schematic diagram exemplifying a mobile robot according to Embodiment 1.

FIG. 1 is a schematic diagram exemplifying a mobile robot according to Embodiment 1. As shown in FIG. 1, a mobile robot 100 is an example of an autonomous movement device that performs autonomous movement in a predetermined facility 900. For example, the predetermined facility 900 is a hospital. The predetermined facility 900 is not limited to the hospital, and may be a hotel, a shopping mall or the like, as long as the mobile robot 100 can perform autonomous movement in the facility 900.

The mobile robot 100 performs autonomous movement on a floor surface 910 in the facility 900. A facility camera 400 is fixed in the facility 900. For example, the facility camera 400 is fixed on a ceiling 920 of the facility 900, and photographs a predetermined range 410 in the periphery of the facility camera 400, to generate image data. For example, the facility camera 400 photographs a passage, a corner, a passerby, another mobile robot 100, and the like. In the facility 900, a plurality of facility cameras 400 may be provided.

The mobile robot 100 and the facility camera 400 are connected so as to communicate with each other through information transmission means such as wireless communication. For example, the mobile robot 100 and the facility camera 400 may be connected so as to directly communicate, or may be connected so as to communicate through an access point 500 and a server device 300. Consequently, the mobile robot 100 may directly acquire the image data from the facility camera 400, or may acquire the image data through the access point 500 and the server device 300.

For example, the access point 500 is an access point for a wireless LAN. The access point 500 is fixed in the facility 900, and is connected with the mobile robot 100 inside a predetermined range 510 in the periphery of the access point 500, by wireless communication. In the facility 900, a plurality of access points 500 may be provided.

In the facility 900, a plurality of mobile robots 100 may perform autonomous movement. In the case where a plurality of mobile robots 100 performs autonomous movement, the plurality of mobile robots 100 may be connected so as to communicate with each other through information transmission means such as wireless communication. For example, the plurality of mobile robots 100 may be connected so as to directly communicate with each other, or may be connected so as to communicate with each other through the access point 500 and the server device 300.

In the facility 900, a base point 600 may be provided. For example, the base point 600 is a mark provided on the ceiling 920. The base point 600 is not limited to the mark provided on the ceiling 920. The base point 600 may be fixed on the floor surface 910, a wall surface or the like, instead of the ceiling 920. Further, the base point 600 is not limited to the mark. The base point 600 may be a code such as a QR code (R) and a bar code, or may be a light emission point, an RFID tag, a charger for a battery built in the mobile robot 100, or the like. In the facility 900, a plurality of base points 600 may be provided.

When the mobile robot 100 is positioned at the base point 600 fixed in the facility 900, the mobile robot 100 acquires base point information that is a reference for the position in the facility 900. For example, the mobile robot 100 stops just below or just above the base point 600, or other position where the base point information can be acquired, and thereby acquires the base point information. The base point information obtained from the base point 600 is a reference for position information in the facility 900, and is information for enhancing the accuracy of the position information. For example, the mobile robot 100 adds distance information detected by sensors of the mobile robot 100, to the base point information acquired from the base point 600, and thereby calculates the position information. Specifically, the mobile robot 100 updates the position information by adding a traveling distance from the base point 600 and a traveling direction. Thereby, the mobile robot 100 can enhance the accuracy of the position information.

Figure 2:
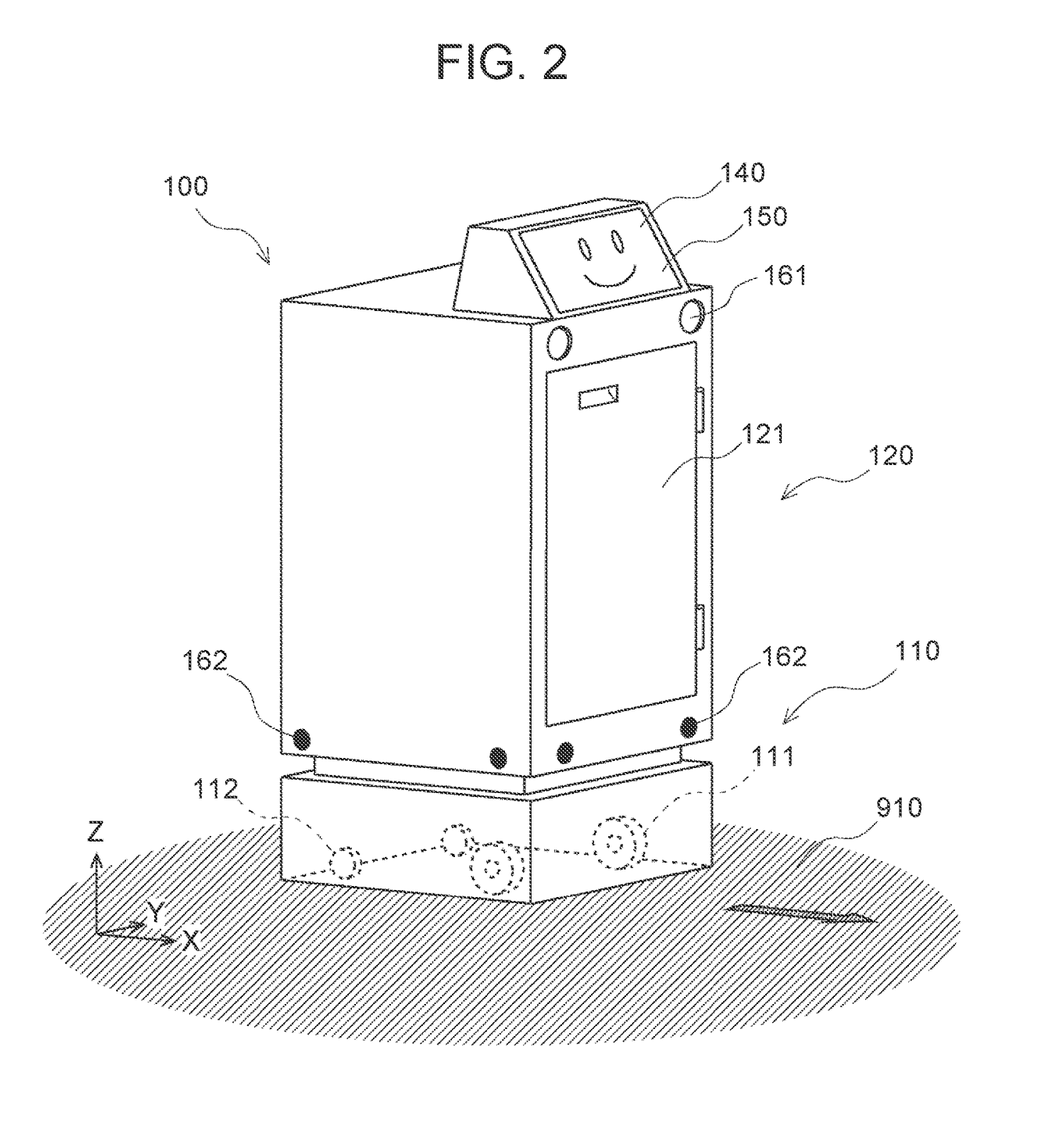
FIG. 2 is a perspective view exemplifying the mobile robot according to Embodiment 1.
Figure 3:
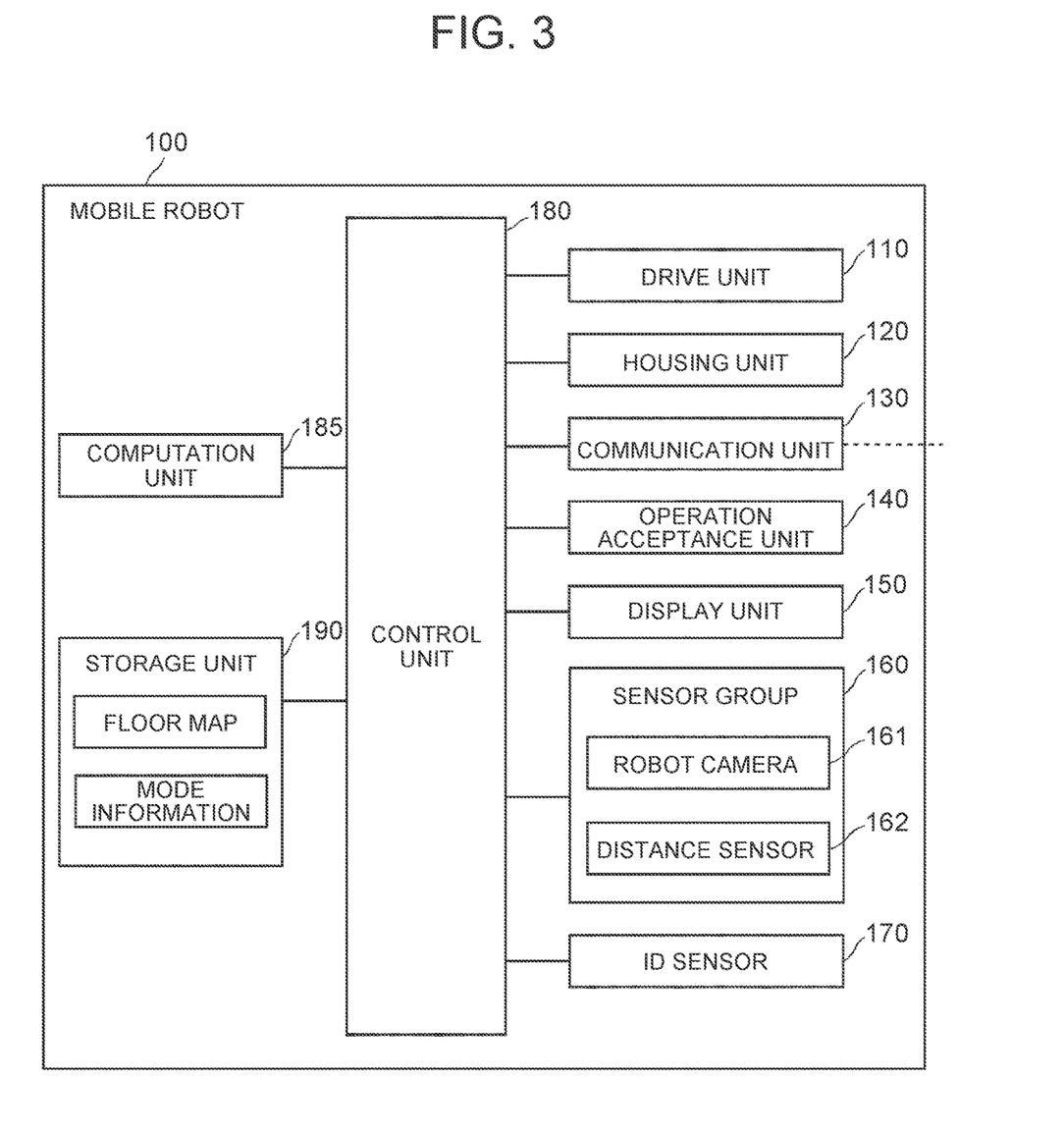
FIG. 3 is a block diagram exemplifying the mobile robot according to Embodiment 1.

FIG. 2 is a perspective view exemplifying the mobile robot 100 according to Embodiment 1. FIG. 3 is a block diagram exemplifying the mobile robot 100 according to Embodiment 1. As shown in FIG. 2 and FIG. 3, the mobile robot 100 includes a drive unit 110, a housing unit 120, a communication unit 130, an operation acceptance unit 140, a display unit 150, a sensor group 160, an ID sensor 170, a control unit 180, a computation unit 185, and a storage unit 190.

As shown in FIG. 2, the mobile robot 100 is a mobile body that moves on the floor surface 910 as a movement surface. Here, an XYZ orthogonal coordinate axis system is used for convenience of description of the mobile robot 100. The floor surface 910 is on an X-Y plane, and the upward direction is a +Z-axis direction.

The drive unit 110 functions as movement means for the mobile robot 100. The drive unit 110 may include two drive wheels 111 contacting with the floor surface 910 and casters 112 contacting with the floor surface 910. The two drive wheels 111 are set so as to rotate about one rotation shaft extending in a direction (a right-left direction or a Y-axis direction in the figure) orthogonal to a straight-ahead direction (a front-rear direction or an X-axis direction in the figure), independently from each other. The mobile robot 100 performs forward movement or rearward movement by driving the drive wheels 111 disposed on right and left sides at an identical rotation number, and performs turning by making a difference in rotation speed or rotation direction between the right and left drive wheels 111. The drive unit 110 drives the drive wheels 111 in response to an instruction from the control unit 180.

The housing unit 120 is disposed above the drive unit 110 in the mobile robot 100. The housing unit 120 may include a containing chamber door 121. When the containing chamber door 121 is opened, a containing chamber for containing a predetermined article is provided within the housing unit 120. That is, the mobile robot 100 can serve as a carrying robot that carries the predetermined article. The housing unit 120 may open or close the containing chamber door 121 in response to an instruction from the control unit 180.

As shown in FIG. 3, the communication unit 130 is an interface for communicable connection with the exterior. For example, the communication unit 130 includes an antenna, a circuit that performs modulation or demodulation of a signal to be sent through the antenna, and the like. The communication unit 130 receives the image data directly from the facility camera 400 or through the access point 500 and the server device 300.

The communication unit 130 may receive information relevant to a destination, position information, traveling information and the like, from the server device 300. Further, the communication unit 130 may send information relevant to the state of the mobile robot 100, position information, traveling information and the like, to the server device 300. Further, the communication unit 130 may exchange the position information and the image data with another mobile robot 100, directly or through the access point 500 and the server device 300.

The communication unit 130 may periodically send a heartbeat signal to the server device 300. The heartbeat signal may include log data indicating the state of the mobile robot 100 in a chronological order. Further, the heartbeat signal may include an identification (ID) of the mobile robot 100.

The communication unit 130 is connected with the control unit 180. The communication unit 130 outputs a signal including information sent from the facility camera 400 and the server device 300, to the control unit 180, and sends a signal including information output from the control unit 180, to the server device 300.

The operation acceptance unit 140 accepts an input operation from a user, and sends an operation signal to the control unit 180. As means for accepting the input operation from the user, the operation acceptance unit 140 may include an operation button, or a touch panel superimposed on the display unit 150, for example. By operating the input operation means, the user turns an electric power source on or off, and opens or closes the containing chamber door 121.

For example, the display unit 150 is provided on an upper surface of the housing unit 120, so as to protrude. For example, the display unit 150 is a display unit that includes a rectangular liquid crystal panel. The display unit 150 appropriately displays information in response to an instruction from the control unit 180. A touch panel that accepts an operation from the user may be superimposed on the display unit 150.

The sensor group 160 includes a sensor that acquires data necessary for the autonomous movement of the mobile robot 100. For example, the sensor group 160 includes a robot camera 161 and a distance sensor 162. The sensor group 160 may include a sensor other than the robot camera 161 and the distance sensor 162.

For example, the robot camera 161 is disposed at an upper portion of the housing unit 120 below the display unit 150. As the robot camera 161, two camera units having an identical angular field may be disposed so as to be horizontally away from each other. Thereby, images photographed by the respective camera units are output to the control unit 180 as the image data.

For example, the distance sensor 162 is disposed at a lower portion of the housing unit 120. The distance sensor 162 may be disposed at each lower portion of a +X-axis direction side surface, a −X-axis direction side surface, a +Y-axis direction side surface and a −Y-axis direction side surface of the housing unit 120. The distance sensor 162 measures the distance from a physical body in the periphery of the mobile robot 100. The control unit 180 analyzes the image data output by the robot camera 161 and a detection signal output by the distance sensor 162. Thereby, the control unit 180 recognizes an obstacle in the periphery of the mobile robot 100, and measures the distance between the mobile robot 100 and the obstacle.

The mobile robot 100 acquires the base point information with one of the sensor group 160. For example, the mobile robot 100 acquires the base point information by photographing the base point 600 with the robot camera 161. The mobile robot 100 may acquire the base point information through the communication unit 130.

For example, the ID sensor 170 is provided near the display unit 150. The ID sensor 170 identifies an ID of the user that operates the mobile robot 100, and detects a unique identifier included in an ID card that is owned by the user. For example, the ID sensor 170 includes an antenna for reading information in a wireless tag. The user puts the ID card close to the ID sensor 170, and thereby causes the mobile robot 100 to recognize the ID of the user that is an operator.

The control unit 180 is an information processing device that includes a computation device such as a central processing unit (CPU). The control unit 180 includes hardware in the control unit 180 and programs stored in the hardware. That is, a process to be executed by the control unit 180 is realized by one of hardware and software.

The control unit 180 acquires a variety of information from the respective constituents, and gives instructions to the respective constituents depending on the acquired information. For example, the control unit 180 detects the distance between the mobile robot 100 and a physical body in the periphery of the mobile robot 100, from the image data acquired from the robot camera 161, the information about the physical body in the periphery of the mobile robot 100 acquired from the distance sensor 162, and the like. Then, the control unit 180 causes the computation unit 185 to calculate a route to the destination, from the detected distance, and gives an instruction for moving along the route, to the drive unit 110, depending on the calculated route. In the case of executing this process, the control unit 180 refers to information relevant to a floor map stored in the storage unit 190.

Further, the control unit 180 causes the drive unit 110 to move to the base point 600 fixed in the facility 900. Then, the control unit 180 causes the sensor group 160 or the communication unit 130 to acquire the base point information.

The computation unit 185 can calculate the position information in the facility 900, from the position of the photographed mobile robot 100 in the acquired image data. The computation unit 185 searches the route from the departure place to the destination, using the position information. The computation unit 185 outputs the searched route to the control unit 180.

The storage unit 190 includes a nonvolatile memory such as a flash memory and a solid state drive (SSD). In the storage unit 190, the floor map of the facility that is used for the autonomous movement of the mobile robot 100 is stored. Further, in the storage unit 190, mode information described later is stored. The storage unit 190 is connected with the control unit 180, and outputs the stored information to the control unit 180, in response to a request from the control unit 180.

As shown in FIG. 2, the forward side of the mobile robot 100 is a +X-axis direction side on which the robot camera 161 is installed. That is, at the time of an ordinary movement, the movement direction is the +X-axis direction as shown by an arrow.

For the definition of the forward side of the mobile robot 100, various concepts can be employed. For example, the forward side can be defined based on how the sensor group 160 for recognizing the peripheral environment is disposed. Specifically, the forward side is defined as the +X-axis direction side of the housing unit 120 on which a sensor having a high recognition capability is disposed or many sensors are disposed. When the forward side is defined in this way, the mobile robot 100 can move while recognizing the peripheral environment more accurately. For the mobile robot 100 in the embodiment, the forward side is defined as the +X-axis direction side on which the robot camera 161 is disposed.

Alternatively, the forward side can be defined based on how the display unit 150 is disposed. When the display unit 150 displays the face of a character or the like, a person in the periphery naturally recognizes that the forward side of the mobile robot 100 is the side of the display unit 150. Hence, when the forward side is defined as the side of a display surface of the display unit 150, the person in the periphery does not have a strong strangeness feeling. For the mobile robot 100 in the embodiment, the forward side is defined as the side of the display surface of the display unit 150.

Further, the forward side may be defined based on the housing shape of the mobile robot 100. For example, in the case where the projection shape on a traveling surface of the housing unit 120 is a rectangle, the housing unit 120 does not interfere with a passing person at the time of movement when the forward side is a shorter side, compared to when the forward side is a longer side. That is, depending on the housing shape, there is a housing surface that preferably should be the forward side at the time of the ordinary movement. For the mobile robot 100 in the embodiment, the forward side is defined as the shorter side of the rectangle. As described above, the forward side of the mobile robot 100 is defined based on some concepts. The concept from which the forward side is defined may be decided in consideration of the shape, role and others of the mobile robot.

Behavior of Mobile Robot

Next, a behavior of the mobile robot in the embodiment will be described. For example, the user turns on the electric power source of the mobile robot 100. Then, the user inputs a desired task to the operation acceptance unit 140. When the user turns on the electric power source or when the user operates the operation acceptance unit 140, the ID of the user is identified by the ID sensor 170, as necessary.

For carrying an article as the desired task, the user operates the operation acceptance unit 140, opens the containing chamber door 121, and puts the article in the containing chamber. Then, the user operates the operation acceptance unit 140, and closes the containing chamber door 121. Next, the user inputs a carry destination of the article from the operation acceptance unit 140. The control unit 180 of the mobile robot 100 causes the computation unit 185 to search a route to the carry destination using the floor map stored in the storage unit 190. The mobile robot 100 performs autonomous movement along the searched route.

Figure 4:
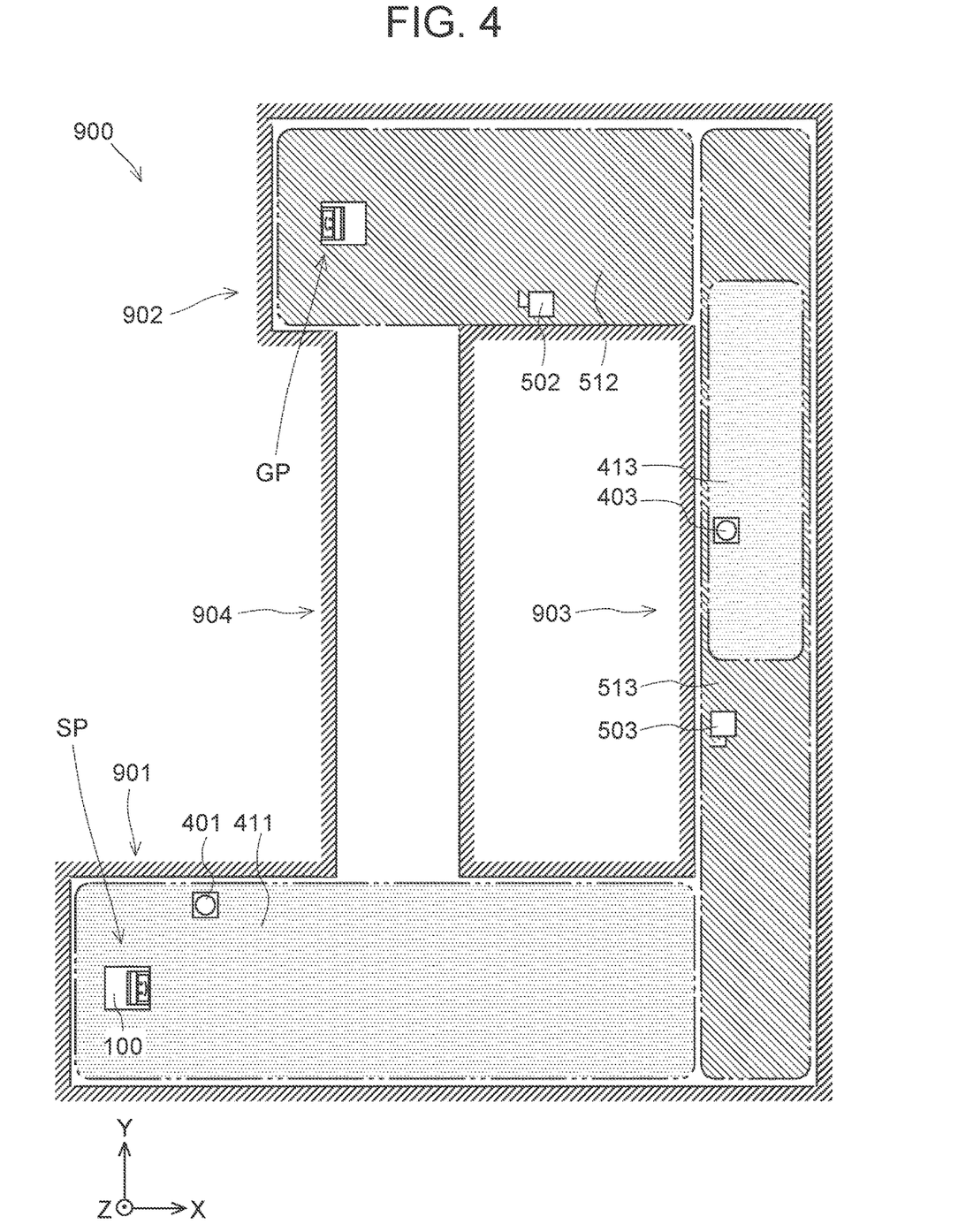
FIG. 4 is a plan view exemplifying a movement method of the mobile robot according to Embodiment 1 in a facility.

FIG. 4 is a plan view exemplifying a movement method of the mobile robot 100 according to Embodiment 1 in the facility 900. As shown in FIG. 4, for example, a room 901 and a room 902 are provided in the facility 900. The room 901 and the room 902 communicate with each other through a passage 903. Further, the room 901 and the room 902 communicate with each other through a passage 904 also.

In the room 901, a facility camera 401 is provided. In the case where the facility camera is collectively indicated, "0" is put as the last digit of the reference numeral, as shown by a facility camera 400, and in the case where a particular facility camera is indicated, a digit other than "0" is put as the last digit of the reference numeral, as shown by the facility camera 401 and the like. The facility camera 401 photographs a predetermined range 411 of the room 901, to generate image data. The mobile robot 100 acquires the image data photographed by the facility camera 401. The mobile robot 100 may acquire the position information from the sensor group 160, and may acquire the position information from the image data. In this way, the mobile robot 100 may acquire the position information in cooperation with the facility camera 401. Among the states of the mobile robot 100, a state of moving while acquiring the position information in cooperation with the facility camera 401 inside the range 411 that the facility camera 401 fixed in the facility 900 photographs to generate the image data is referred to as a cooperation mode.

In the room 902, an access point 502 is provided. In the case where the access point is collectively indicated, "0" is put as the last digit of the reference numeral, as shown by an access point 500, and in the case where a particular access point is indicated, a digit other than "0" is put as the last digit of the reference numeral, as shown by the access point 502 and the like. The access point 502 is connected with the mobile robot 100 inside a predetermined range 512 in the room 902, by wireless communication.

In the passage 903, a facility camera 403 is provided. The facility camera 403 photographs a predetermined range 413 in the passage 903, to generate image data. In the passage 903, an access point 503 is provided. The access point 503 is connected with the mobile robot 100 inside a predetermined range 513 in the passage 903, by wireless communication.

For example, the range 413 is smaller than the range 513. Further, the range 413 is included in the range 513. In that case, the range 413 is superimposed on the range 513. Further, there is a portion inside the range 513 and outside the range 413. Among the states of the mobile robot 100, a state of moving inside the range 513 in which the connection with the access point 503 fixed in the facility 900 is performed by wireless communication and outside the range 413 is referred to as a connection mode.

In the passage 904, the facility camera 400 and the access point 500 are not provided. Further, the passage 904 is outside the range 411 photographed by the facility camera 401 and outside the range 413 photographed by the facility camera 403. Furthermore, the passage 904 is outside the range 512 in which the connection with the access point 502 is performed in a communicable manner and outside the range 513 in which the connection with the access point 503 is performed in a communicable manner. Among the states of the mobile robot 100, a state of moving outside the range 411 and the range 413 and outside the range 512 and the range 513 is referred to as a caution mode.

For example, the mobile robot 100 moves from a departure place SP in the room 901 to a destination GP in the room 902. In that case, the mobile robot 100 changes the movement speed for autonomous movement depending on the cooperation mode, the connection mode and the caution mode. For example, the movement speed of the mobile robot 100 differs between a case where the mobile robot 100 moves the inside range 411 in the room 901 and a case where the mobile robot 100 moves inside the range 512 in the room 902.

Inside the range 411 in the room 901, the mobile robot 100 is in the cooperation mode, and moves at a movement speed V1. Inside the range 512 in the room 902, the mobile robot 100 is in the connection mode, and moves at a movement speed V2. In the passage 904, the mobile robot 100 is in the caution mode, and moves at a movement speed V3. In this way, the movement speed for the autonomous movement of the mobile robot 100 differs depending on the mode. For example, the movement speed V1 in the cooperation mode is higher than the movement speed V2 in the connection mode and the movement speed V3 in the caution mode. The movement speed V2 in the connection mode is higher than the movement speed V3 in the caution mode.

In the cooperation mode, the facility cameras 401, 403 can photograph the mobile robot 100. Consequently, even when the moving mobile robot 100 deviates from the previously set route, the position deviation can be immediately detected. For example, by the pattern recognition of the image data, the position deviation can be immediately detected. The method for detecting the position deviation from the image data is not limited to the pattern recognition. After the detection of the position deviation, the mobile robot 100 can immediately correct the position information. Thereby, it is possible to increase the movement speed to a speed allowing the detection of the position deviation and the correction.

In the connection mode, the facility cameras 401, 403 cannot photograph the mobile robot 100. Consequently, when the moving mobile robot 100 deviates from the previously set route, the time taken to detect the position deviation is longer compared to the cooperation mode. Further, the time taken to correct the position information about the mobile robot 100 is longer compared to the cooperation mode. Consequently, the speed allowing the detection of the position deviation and the correction is lower compared to the cooperation mode.

In the caution mode, it is not possible to check the mobile robot 100 through the facility camera 400 and the access point 500. Consequently, when the position of the moving mobile robot 100 deviates from the previously set route, the time taken to detect the position deviation is longer compared to the cooperation mode and the connection mode. Further, the time taken to correct the position information about the mobile robot 100 is longer compared to the cooperation mode and the connection mode. Consequently, the speed allowing the detection of the position deviation and the correction is lower compared to the cooperation mode and the connection mode.

The mobile robot 100 may search the route for autonomous movement such that the necessary time is short, based on the movement speed in the cooperation mode, the movement speed in the connection mode and the movement speed in the caution mode. For example, a route A from the departure place SP in the room 901 through the passage 903 to the destination GP in the room 902 includes a distance of 10 [m] inside the range 411 in the cooperation mode, a distance of 10 [m] inside the range 513 other than the range 413 in the connection mode, a distance of 5 [m] inside the range 413 in the cooperation mode, and a distance of 5 [m] inside the range 512 in the connection mode. Further, a route B from the departure place SP in the room 901 through the passage 904 to the destination GP in the room 902 includes a distance of 5 [m] inside the range 411 in the cooperation mode, a distance of 10 [m] in the caution mode, and a distance of 2 [m] inside the range 512 in the connection mode. In this case, as an example, the movement speed in the cooperation mode, the movement speed in the connection mode and the movement speed in the caution mode are 1 [m/s], 0.5 [m/s] and 0.2 [m/s], respectively. Therefore, the distance of the route A is 30 [m], and the necessary time for the route A is 45 [s]. On the other hand, the distance of the route B is 17 [m], and the necessary time for the route B is 59 [s]. Consequently, the mobile robot 100 searches the route A for which the necessary time is shorter although the distance is longer.

Further, the mobile robot 100 searches the route for autonomous movement such that a section for the cooperation mode is large. In the cooperation mode, the mobile robot 100 can be checked by the facility camera 400. Therefore, even when the mobile robot 100 deviates from the previously set route, the position deviation can be immediately detected, and the position information about the mobile robot 100 can be corrected. Consequently, in the cooperation mode, it is possible to enhance the accuracy at which the mobile robot 100 is positioned on the previously set route.

In contrast, in the caution mode, the accuracy at which the mobile robot 100 is positioned on the previously set route is low, and the position deviation can occur. Consequently, at the time of the return to the cooperation mode from the caution mode, the mobile robot 100 revises the position information held by the mobile robot 100. For example, the mobile robot 100 compares the position information calculated based on the image data about the mobile robot 100 photographed by the facility camera 400 and the position information held by the mobile robot 100, and eliminates the difference. Further, the mobile robot 100 may acquire the base point information at the base point 600 fixed in the facility 900, and may revise the position information held by the mobile robot 100, using the position information calculated based on the base point information. Accordingly, it is preferable that the base point 600 be provided in the range 410 that the facility camera 400 photographs to generate the image data.

Figure 5:
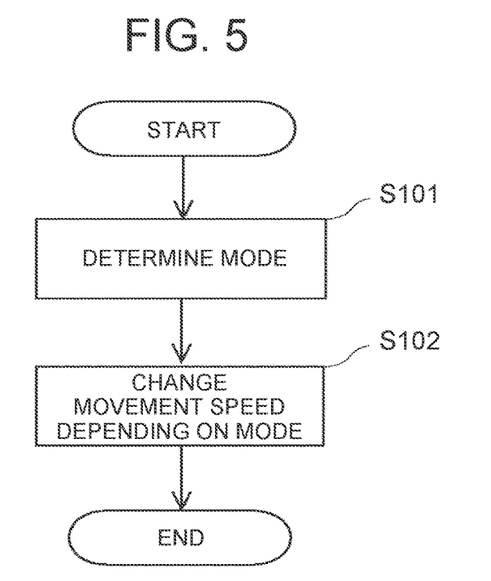
FIG. 5 is a flowchart exemplifying the movement method of the mobile robot according to Embodiment 1.

A movement method of the mobile robot 100 described above will be described with reference to flowcharts. FIG. 5 is a flowchart exemplifying the movement method of the mobile robot according to Embodiment 1. As shown in step S101 of FIG. 5, first, the mobile robot 100 determines a mode from the cooperation mode, the connection mode and the caution mode. Next, as shown in step S102, the mobile robot 100 changes the movement speed for autonomous movement depending on the mode.

Figure 6:
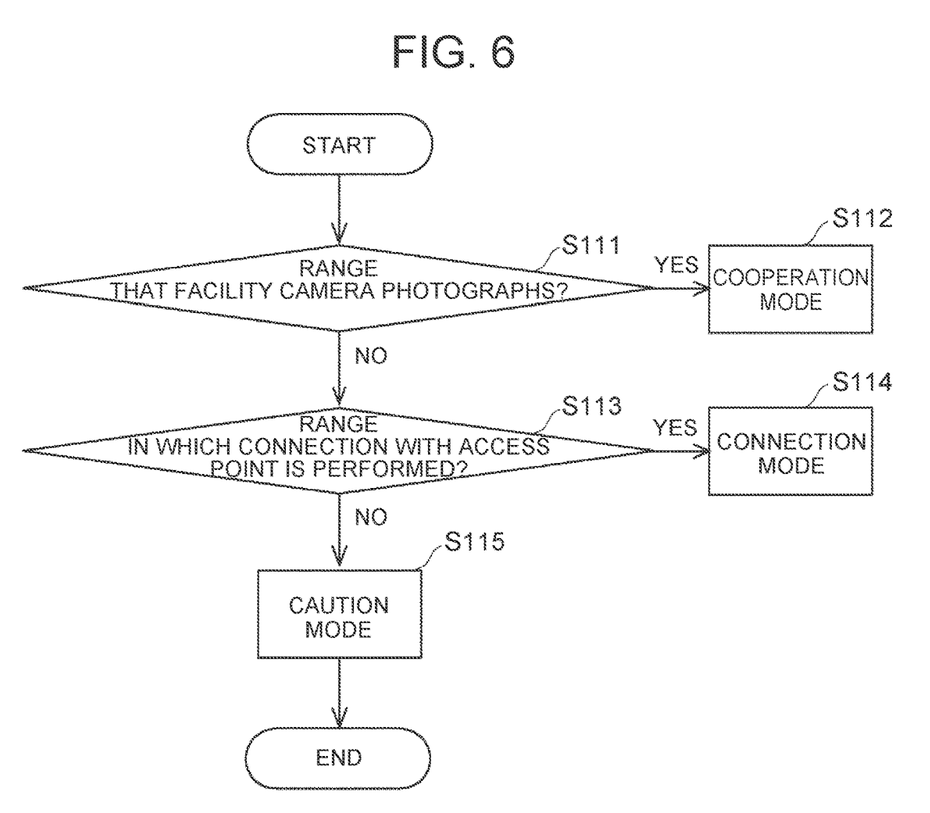
FIG. 6 is a flowchart exemplifying a determination method for a mode of the mobile robot according to Embodiment 1.

Next, a method for determining the mode in step S101 will be described. FIG. 6 is a flowchart exemplifying a determination method for the mode of the mobile robot according to Embodiment 1. As shown in step S111 of FIG. 6, the mobile robot 100 determines whether the mobile robot 100 is inside the range 410 that the facility camera 400 photographs at the time of movement. For example, the control unit 180 determines whether the communication unit 130 has received the image data resulting from photographing the mobile robot 100. Alternatively, the control unit 180 determines whether the mobile robot 100 is inside the range 410 on the previously stored floor map. In the case where the mobile robot 100 is inside the range 410, it is determined that the mobile robot 100 is in the cooperation mode, as shown in step S112.

On the other hand, in the case where the mobile robot 100 is not inside the range 410 that the facility camera 400 photographs in step S111, the mobile robot 100 determines whether the mobile robot 100 is inside the range 510 in which the connection with the access point 500 is performed, as shown in step S113. In the case where the mobile robot 100 is inside the range 510 that the connection with the access point 500 is performed, it is determined that the mobile robot 100 is in the connection mode, as shown in step S114.

On the other hand, in the case where the mobile robot 100 is not inside the range 510 in which the connection with the access point 500 is performed in step S113, it is determined that the mobile robot 100 is in the caution mode, as shown in step S115. In this way, the mobile robot 100 determines the mode of the mobile robot 100.

The mobile robot 100 may performs the process in steps S111 to S115 whenever the communication with the facility camera 400 or the communication with the access point 500 changes. Further, the mobile robot 100 may perform the process in steps S111 to S115 whenever a predetermined time elapses, or may perform the process in steps S111 to S115 whenever the mobile robot 100 moves by a predetermined distance.

Figure 7:
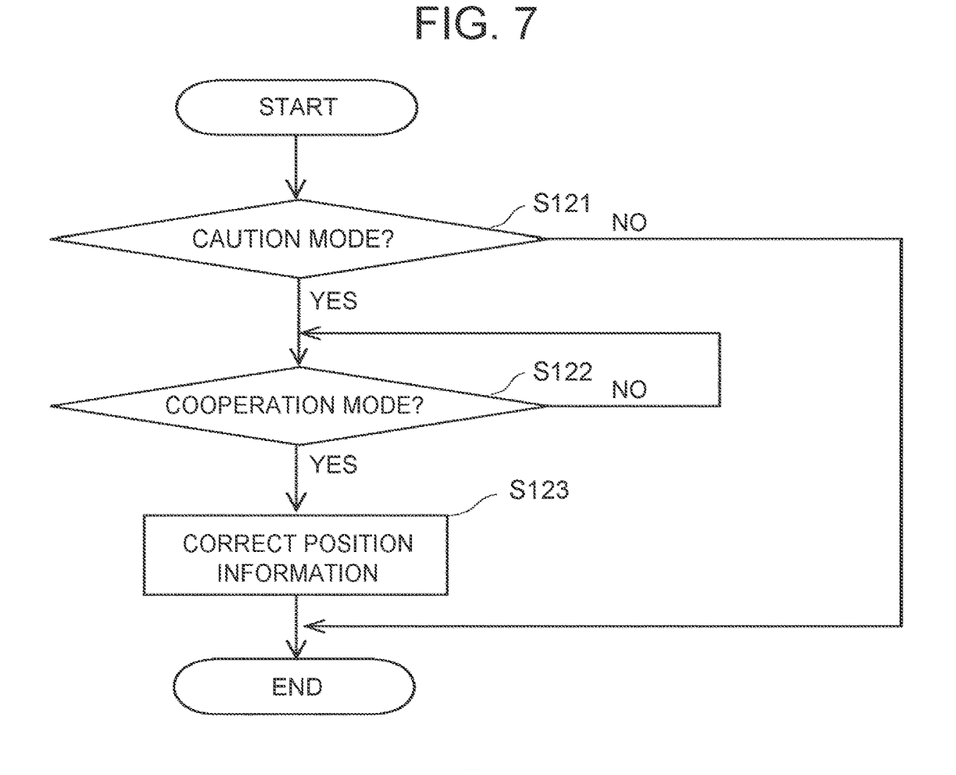
FIG. 7 is a flowchart exemplifying a correction process for position information about the mobile robot according to Embodiment 1.

Next, a correction process for the position information about the mobile robot 100 will be described. In the caution mode, the mobile robot 100 cannot check the position with the facility camera 400 and the access point 500. Therefore, in the case of the movement in the caution mode, the position information can include an error. Consequently, at the time of the transition from the caution mode to the cooperation mode, the mobile robot 100 corrects the position information. FIG. 7 is a flowchart exemplifying the correction process for the position information about the mobile robot according to Embodiment 1.

As shown in step S121 of FIG. 7, it is determined whether the mobile robot 100 is in the caution mode. In the case where the mobile robot 100 is not in the caution mode, the process is ended. In the case of the caution mode, as shown in step S122, it is determined whether the mobile robot 100 is in the cooperation mode. In the case where the mobile robot 100 is still in the caution mode or is in the connection mode in step S122, step S122 is continued.

On the other hand, in the case where the mobile robot 100 is not in the caution mode or the connection mode and is in the cooperation mode in step S122, the mobile robot 100 corrects the position information, as shown in step S123. It may be determined whether the mobile robot 100 is in the connection mode or the cooperation mode in step S122, and in the case of the connection mode or the cooperation mode, the position information may be corrected.

With the embodiment, the mobile robot 100 changes the movement speed depending on the cooperation mode, the connection mode and the caution mode. In this way, it is possible to control the movement speed to a movement speed depending on the control state of the mobile robot 100, and therefore it is possible to enhance the flexibility of the control mode. Thereby, it is possible to shorten the movement time while restraining the position deviation from the movement route. Further, the mobile robot 100 searches the movement route such that the necessary time is short, based on the cooperation mode, the connection mode and the caution mode. Consequently, it is possible to shorten the movement time. Furthermore, the mobile robot 100 may search the route for autonomous movement such that the section for the cooperation mode is large. Thereby, it is possible to restrain the position deviation. When the mobile robot 100 in the caution mode returns to the cooperation mode, the mobile robot 100 corrects the position information, and therefore it is possible to restrain the position deviation from the movement route.

Embodiment 2

Next, an autonomous movement system according to Embodiment 2 will be described. The autonomous movement system in the embodiment is a system that controls an autonomous movement device that performs autonomous movement in a predetermined facility 900. The autonomous movement system will be described by being divided into Configuration of Autonomous Movement System and Behavior of Autonomous Movement System.

Configuration of Autonomous Movement System

The autonomous movement system includes a mobile robot 100, a server device 300 and a facility camera 400. The autonomous movement system may include a plurality of mobile robots 100.

Mobile Robot

The configuration of the mobile robot 100 in the embodiment is the same as that in Embodiment 1 described above. The mobile robot 100 in the embodiment may cause the server device 300 to execute some functions of the mobile robot 100 in Embodiment 1. For example, the image data photographed by the facility camera 400 may be acquired by the server device 300, and the position information about the mobile robot 100 may be calculated by the server device 300. Further, the mode of the mobile robot 100 may be determined by the server device 300. The mobile robot 100 may acquire the position information calculated by the server device 300 and the mode information determined by the server device 300, from the server device 300.

Server Device

For example, the server device 300 is a computer that includes a communication function. The server device 300 may be installed at an arbitrary place as long as the server device 300 can communicate with constituents of the autonomous movement system. The server device 300 may exchange traveling information with the mobile robot 100, and may acquire the image data from the facility camera 400.

Figure 8:
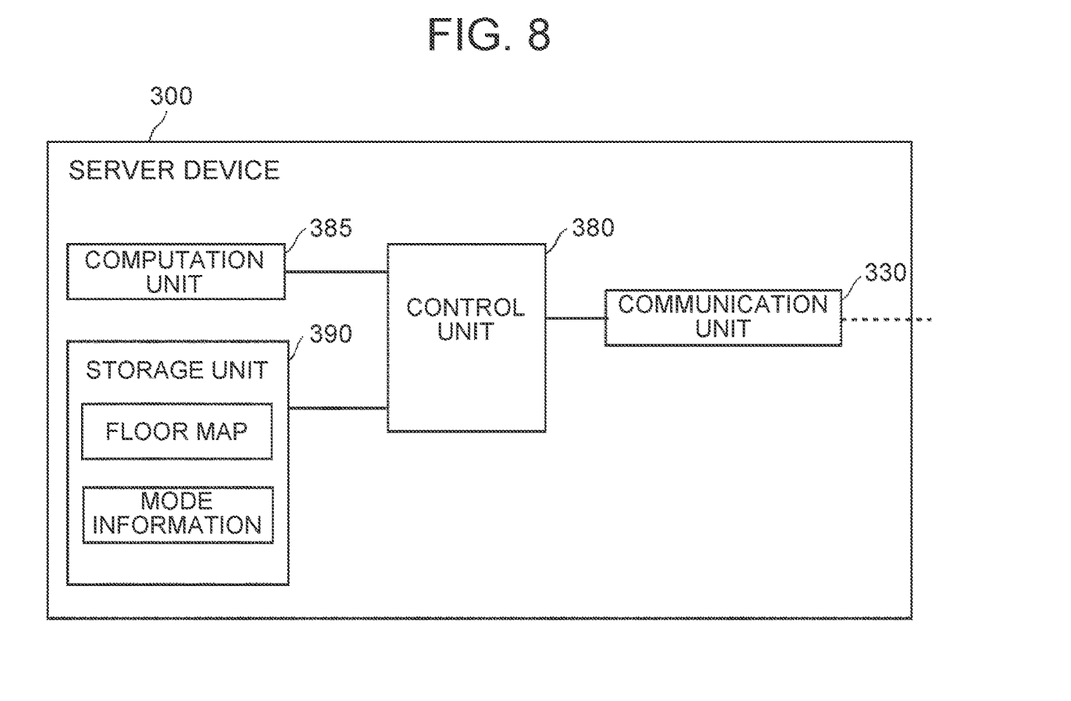
FIG. 8 is a block diagram exemplifying a server device according to Embodiment 2.

FIG. 8 is a block diagram exemplifying the server device according the Embodiment 2. As shown in FIG. 8, the server device 300 includes a communication unit 330, a control unit 380, a computation unit 385 and a storage unit 390.

The communication unit 330 individually communicates with the mobile robot 100, the facility camera 400 and the access point 500. The communication unit 330 outputs signals received from the constituents, to the control unit 380. Further, the communication unit 330 sends signals output from the control unit 380, to constituents, when appropriate. The communication unit 330 may include a router device for communicating with the server device 300, a plurality of mobile robots 100, the facility camera 400 and the like. The communication unit 330 may include a plurality of different communication means respectively corresponding to constituent elements that communicate with the server device 300, a plurality of mobile robots 100, the facility camera 400 and the like. The communication unit 330 may be connected with the constituents through an intranet or internet line in a communicable manner.

The control unit 380 is constituted by a computation device such as a CPU, and performs various information processes. The control unit 380 acquires the position information from the mobile robot 100 through the communication unit 330, and acquires the image data from the facility camera 400. Further, the control unit 380 may determine the mode of each mobile robot 100.

The computation unit 385 calculates the position information about the mobile robot 100, from the image data resulting from photographing the mobile robot 100. Further, the computation unit 385 may search the route for the autonomous movement of each mobile robot 100, and may calculate the necessary time for the autonomous movement.

The storage unit 390 includes a nonvolatile memory such as a flash memory and an SSD. In the storage unit 390, the floor map of the facility that is used for the autonomous movement of the mobile robot 100 is stored. Further, in the storage unit 390, the mode information about the mobile robot 100 is stored. The storage unit 390 is connected with the control unit 380, and outputs the stored information to the control unit 380, in response to a request from the control unit 380.

Behavior of Autonomous Movement System

Figure 9:
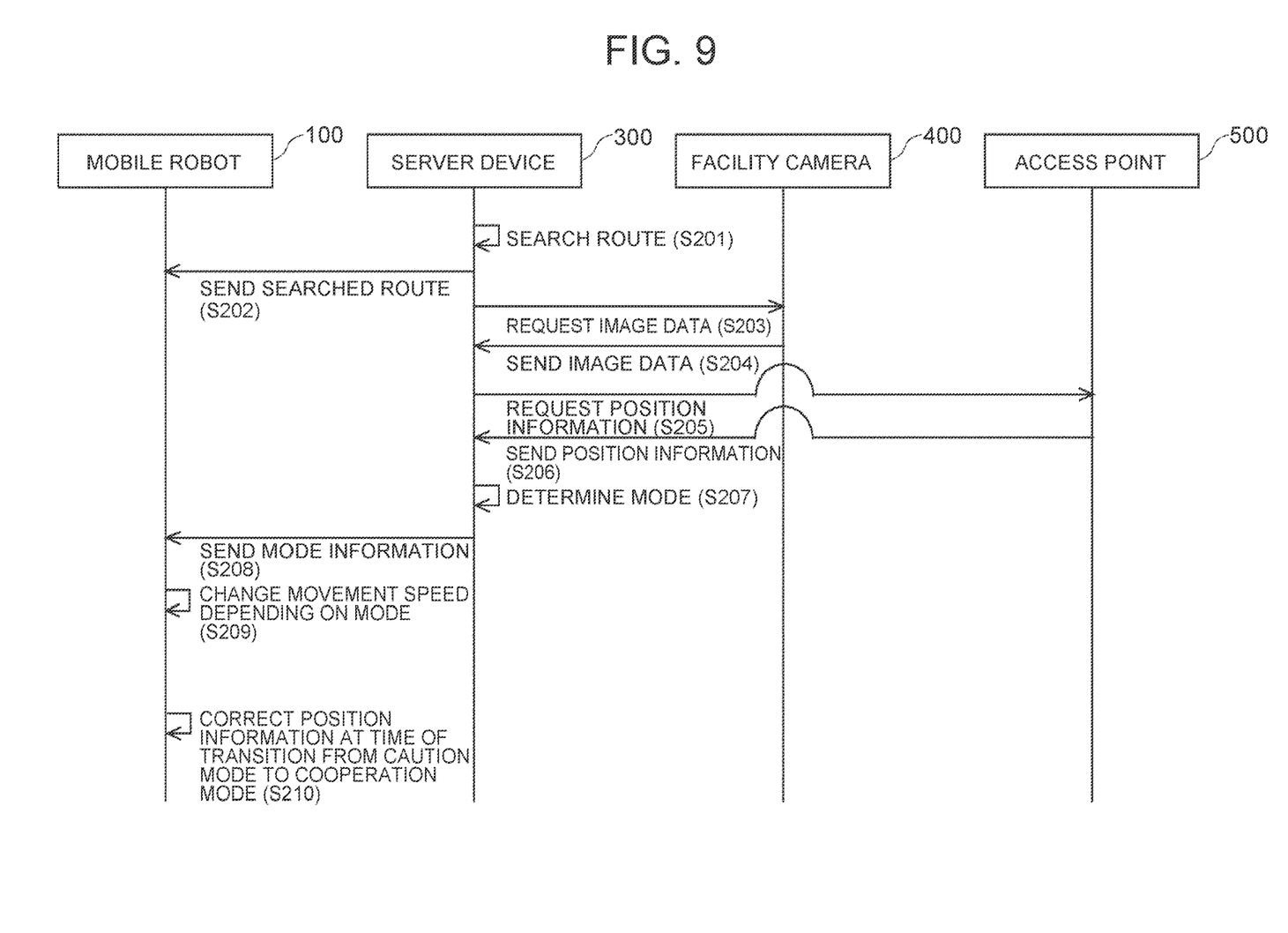
FIG. 9 is a sequence diagram exemplifying a behavior of an autonomous movement system according to Embodiment 2.

Next, a behavior of the autonomous movement system will be described. FIG. 9 is a sequence diagram exemplifying the behavior of the autonomous movement system according to Embodiment 2.

As shown in step S201 of FIG. 9, the server device 300 may search the movement route of the mobile robot 100 that performs autonomous movement in the facility 900. For example, the server device 300 may search the route for autonomous movement such that the necessary time is short, based on the movement speed in the cooperation mode, the movement speed in the connection mode and the movement speed in the caution mode. Further, the server device 300 may search the route for autonomous movement such that a section for the cooperation mode is large.

Next, as shown in step S202, the server device 300 may send the searched route to the mobile robot 100. The mobile robot 100 may receive the route searched by the server device 300.

Next, as shown in step S203, the server device 300 requests the image data resulting from photographing the mobile robot 100, to the facility camera 400. In response to this request, as shown in step S204, the facility camera 400 sends the image data resulting from photographing the mobile robot 100, to the server device 300. The server device 300 receives the image data.

Further, as shown in step S205, the server device 300 requests the position information about the mobile robot 100, to the access point 500 connected with the mobile robot 100. In response to this request, as shown in step S206, the access point 500 sends the position information about the mobile robot 100, to the server device 300. The server device 300 receives the position information.

Next, as shown in step S207, the server device 300 determines the mode of the mobile robot 100. For example, the control unit 380 of the server device 300 determines the mode of the mobile robot 100, based on the position information acquired from the image data and the position information acquired through the access point 500.

Next, as shown in step S208, the server device 300 sends the determined mode information to the mobile robot 100. The mobile robot 100 receives the mode information. Then, as shown in S209, the mobile robot 100 changes the movement speed for autonomous movement depending on the mode. As shown in step S210, the mobile robot 100 may correct the position information at the time of the transition from the caution mode to the cooperation mode.

With the embodiment, the server device 300 can search the route along which the mobile robot 100 moves in the facility 900. Further, the server device 300 can determine the mode of the mobile robot 100. Consequently, it is possible to reduce the burden on the mobile robot 100, and to enhance the processing speed of the mobile robot 100.

Further, the server device 300 can integrally control the behaviors of a plurality of mobile robots 100. Therefore, it is possible to coordinate the behaviors of the mobile robots 100, and to enhance the whole movement efficiency of the system. The other configurations, behaviors and effects are included in the description of Embodiment 1.

The present disclosure is not limited to the above embodiments, and can be appropriately modified without departing from the spirit. For example, combinations of constituents in Embodiment 1 and Embodiment 2 are included in the scope of the technical idea of the present disclosure. Further, autonomous movement methods and autonomous movement programs described below are included in the scope of the technical idea of the present disclosure.

(Supplement 1)

An autonomous movement method for an autonomous movement device that performs autonomous movement in a facility, the autonomous movement method comprising:
  a step of determining a mode from a cooperation mode, a connection mode and a caution mode,
    the cooperation mode being a mode of moving while acquiring position information inside a first range in cooperation with a facility camera, the first range being a range that the facility camera photographs to generate image data, the facility camera being fixed in the facility,
    the connection mode being a mode of moving inside a second range and outside the first range, the second range being a range in which connection with an access point is performed by wireless communication, the access point being fixed in the facility,
    the caution mode being a mode of moving outside the first range and outside the second range; and
  a step of changing a movement speed for the autonomous movement depending on the determined mode.

(Supplement 2)

The autonomous movement method according to supplement 1, wherein the movement speed in the cooperation mode is higher than the movement speed in the connection mode and the movement speed in the caution mode, and the movement speed in the connection mode is higher than the movement speed in the caution mode.

(Supplement 3)

The autonomous movement method according to supplement 1 or 2, wherein a route for the autonomous movement is searched such that a necessary time is short, based on the movement speed in the cooperation mode, the movement speed in the connection mode and the movement speed in the caution mode.

(Supplement 4)

The autonomous movement method according to supplement 1 or 2, wherein a route for the autonomous movement is searched such that a section for the cooperation mode is large.

(Supplement 5)

An autonomous movement program for an autonomous movement device that performs autonomous movement in a facility, the autonomous movement program causing a computer to execute:
  determining a mode from a cooperation mode, a connection mode and a caution mode,
    the cooperation mode being a mode of moving while acquiring position information inside a first range in cooperation with a facility camera, the first range being a range that the facility camera photographs to generate image data, the facility camera being fixed in the facility,
    the connection mode being a mode of moving inside a second range and outside the first range, the second range being a range in which connection with an access point is performed by wireless communication, the access point being fixed in the facility,
    the caution mode being a mode of moving outside the first range and outside the second range; and
  changing a movement speed for the autonomous movement depending on the determined mode.

(Supplement 6)

The autonomous movement program according to supplement 5, wherein the computer executes setting the movement speed in the cooperation mode to be higher than the movement speed in the connection mode and the movement speed in the caution mode, and setting the movement speed in the connection mode to be higher than the movement speed in the caution mode.

(Supplement 7)

The autonomous movement program according to supplement 5 or 6, wherein the computer executes searching a route for the autonomous movement such that a necessary time is short, based on the movement speed in the cooperation mode, the movement speed in the connection mode and the movement speed in the caution mode.

(Supplement 8)

The autonomous movement program according to supplement 5 or 6, wherein the computer executes searching a route for the autonomous movement such that a section for the cooperation mode is large.

What is claimed is:

1. An autonomous movement system comprising:
  a mobile robot that performs autonomous movement in a facility;
  a facility camera that photographs a first range in the facility to generate image data, the facility camera being fixed in the facility;
  an access point that is connected with the mobile robot inside a second range in the facility by wireless communication, the access point being fixed in the facility; and
  a server device that exchanges traveling information with the mobile robot and that acquires the image data from the facility camera, wherein
  the mobile robot changes a movement speed for the autonomous movement depending on a cooperation mode, a connection mode, and a caution mode,
  the cooperation mode being a mode of moving while acquiring position information inside the first range in cooperation with the facility camera,
  the connection mode being a mode of moving inside the second range and outside the first range, and
  the caution mode being a mode of moving outside the first range and outside the second range.

2. The autonomous movement system according to claim 1, wherein the movement speed in the cooperation mode is higher than the movement speed in the connection mode and the movement speed in the caution mode, and the movement speed in the connection mode is higher than the movement speed in the caution mode.

3. An autonomous movement method for a mobile robot that performs autonomous movement in a facility, the autonomous movement method comprising:
  a step of determining a mode from a cooperation mode, a connection mode, and a caution mode, the cooperation mode being a mode of moving while acquiring position information inside a first range in cooperation with a facility camera, the first range being a range that the facility camera photographs to generate image data, the facility camera being fixed in the facility, the connection mode being a mode of moving inside a second range and outside the first range, the second range being a range in which connection with an access point is performed by wireless communication, the access point being fixed in the facility, and the caution mode being a mode of moving outside the first range and outside the second range; and a step of changing a movement speed for the autonomous movement depending on the determined mode.

4. An autonomous movement program for a mobile robot that performs autonomous movement in a facility, the autonomous movement program causing a computer to execute:

determining a mode from a cooperation mode, a connection mode and a caution mode, the cooperation mode being a mode of moving while acquiring position information inside a first range in cooperation with a facility camera, the first range being a range that the facility camera photographs to generate image data, the facility camera being fixed in the facility, the connection mode being a mode of moving inside a second range and outside the first range, the second range being a range in which connection with an access point is performed by wireless communication, the access point being fixed in the facility, and the caution mode being a mode of moving outside the first range and outside the second range; and changing a movement speed for the autonomous movement depending on the determined mode.

* * * * *